United States Patent
Griss

(10) Patent No.: US 7,024,813 B2
(45) Date of Patent: Apr. 11, 2006

(54) BAIT HOLDER FOR A FISHING LURE

(76) Inventor: Fred D. Griss, P.O. Box 406, Naselle, WA (US) 98638

(*) Notice: Subject to any disclaimer, the term of this patent is extended or adjusted under 35 U.S.C. 154(b) by 0 days.

(21) Appl. No.: 10/828,943

(22) Filed: Apr. 21, 2004

(65) Prior Publication Data

US 2005/0235549 A1   Oct. 27, 2005

(51) Int. Cl.
*A01K 83/06* (2006.01)

(52) U.S. Cl. .................... 43/44.4; 43/44.2

(58) Field of Classification Search .......... 43/42.06, 43/42.1, 44.2, 44.4, 44.6, 44.8, 42.08
See application file for complete search history.

(56) References Cited

U.S. PATENT DOCUMENTS

| 339,952 | A | * | 4/1886 | Wakeman | 43/44.4 |
| 1,353,779 | A | * | 9/1920 | Moore | 43/42.19 |
| 1,682,710 | A | * | 8/1928 | Pflueger | 43/42.13 |
| 2,054,976 | A | * | 9/1936 | Gould | 43/34 |
| 2,435,730 | A | * | 2/1948 | Worden | 43/42.08 |
| 2,636,306 | A | * | 4/1953 | Sokolik | 43/44.4 |
| 2,911,753 | A | * | 11/1959 | Beckett | 43/43.2 |
| 2,982,049 | A | * | 5/1961 | Yost | 43/44.4 |
| 3,217,443 | A | * | 11/1965 | Goodman | 43/42.51 |
| 3,293,791 | A | * | 12/1966 | Hinkson | 43/44.4 |
| 3,372,508 | A | * | 3/1968 | Maglinger | 43/43.15 |
| 3,795,074 | A | * | 3/1974 | Mantel | 43/44.2 |
| 3,839,815 | A | * | 10/1974 | Latham | 43/44.4 |
| 4,163,339 | A | * | 8/1979 | Worden | 43/44.4 |
| 4,307,532 | A | * | 12/1981 | Hughs | 43/44.4 |
| 4,691,467 | A | * | 9/1987 | Brimmer | 43/44.4 |
| 5,333,407 | A | * | 8/1994 | Merritt | 43/44.4 |
| 5,505,015 | A | * | 4/1996 | Delricco | 43/42.13 |
| 5,548,920 | A | * | 8/1996 | Peddycoart | 43/44.2 |
| 5,881,490 | A | * | 3/1999 | Richardson | 43/44.2 |
| 6,516,552 | B1 | * | 2/2003 | Hawkins | 43/42.09 |

FOREIGN PATENT DOCUMENTS

| CH | 612576 | * | 8/1979 |
| DE | 10108148 | * | 9/2002 |
| FR | 2785145 | * | 5/2000 |
| GB | 2355636 | * | 5/2001 |

* cited by examiner

Primary Examiner—Peter M. Poon
Assistant Examiner—David J. Parsley
(74) Attorney, Agent, or Firm—Christensen O'Connor Johnson Kindness PLLC

(57) ABSTRACT

A fishing lure 10 having an improved bait holder 12 is generally disclosed in FIG. 1. As illustrated, lure 10 includes an elongate shaft 14 which, as shown, is comprised of a piece of wire, preferably stainless steel, having a thickness such that the shaft generally maintains a linear form, during fishing. Wires with a diameter in the range of 0.029 to 0.035 inches have been found to be satisfactory. In general, the shaft acts as a connector between fishing line 16 and a fish hook 18. As illustrated, hook 18 is a treble hook, but it will be understood that single hooks may also be used. In the illustrated embodiment, and beginning at the line end of shaft 14, a metal blade 20 is shown mounted to shaft 14 by means of a clevis 22 such that the blade will spin around shaft 14 as the lure is drawn through the water. Fishing lures typically include spinning components designed to emit flashes of reflective sunlight. Besides blade 20, other items such as multi-winged plugs, spoons and the like may also be used for the same purpose. Blade 20 may be made of stainless steel, silver coated metal or plastic as is commonly known.

10 Claims, 1 Drawing Sheet

BAIT HOLDER FOR A FISHING LURE

FIELD OF THE INVENTION

The present invention relates to fishing lures and, more particularly to fishing lures including means for holding a bait thereon.

BACKGROUND OF THE INVENTION

Hook and line fishermen have a wide variety of choices for attracting fish to their hook. Lures comprising spoons, rotating blades, floating bodies, brightly colored beads of various sizes and shapes or other "spinners" are well known. Other fishermen choose to use bait, fresh or frozen, such as herring for salmon fishing, shrimp, sardines, squid or other baits, connected directly to one or more hooks. It is also known to combine fish attracting lures with bait. A principal problem when using bait which is not mounted directly on a fish hook, is the tendency for the bait to fall off of the lure while it is being dragged through the water. To overcome this problem, baits have been tied to lures with string or elastic thread. This required first tying the elastic thread or a string to the lure then, wrapping it around the bait and lure several times and then tying a second knot to hold the bait in place. Besides presenting a number of chances for a fisherman to hook himself on his own hook while tying the knots, in order to change baits one needed to cut the string or thread and start the time consuming tying process all over again.

SUMMARY OF THE INVENTION

The present invention is directed to overcoming the problems of the prior art and, in particular, comprises a bait holder for a fishing lure which provides an easy means for holding bait on a lure as well as allowing the bait to be easily changed. In one embodiment, a fishing lure is provided including a shaft connected at a first end to a hook. A wire is connected to the shaft such as by wrapping a first end around the shaft. The wire is selected to be of a diameter and type of metal such that it may be easily and repeatedly bent without breaking and will hold its shape after being wrapped around a piece of bait. A bead with a central opening is mounted on the shaft distal from the hook and the free end of the wire is run along the shaft, and through the central opening in the bead. A covering such as a vinyl tube is slipped over the shaft and the bead to provide a cylindrical surface on which a piece of bait may be positioned and held in place by wrapping the free end of the wire around it. Other elements such as round beads, bell shaped beads, blades, spinners and the like may also be mounted on the shaft as fish attractors to form a completed lure.

BRIEF DESCRIPTION OF THE DRAWING

The foregoing aspects and many of the attendant advantages of this invention will become more readily apparent by reference to the following detailed description, when taken in conjunction with the accompanying drawing, wherein.

DETAILED DESCRIPTION OF THE PREFERRED EMBODIMENT

Figure 1:
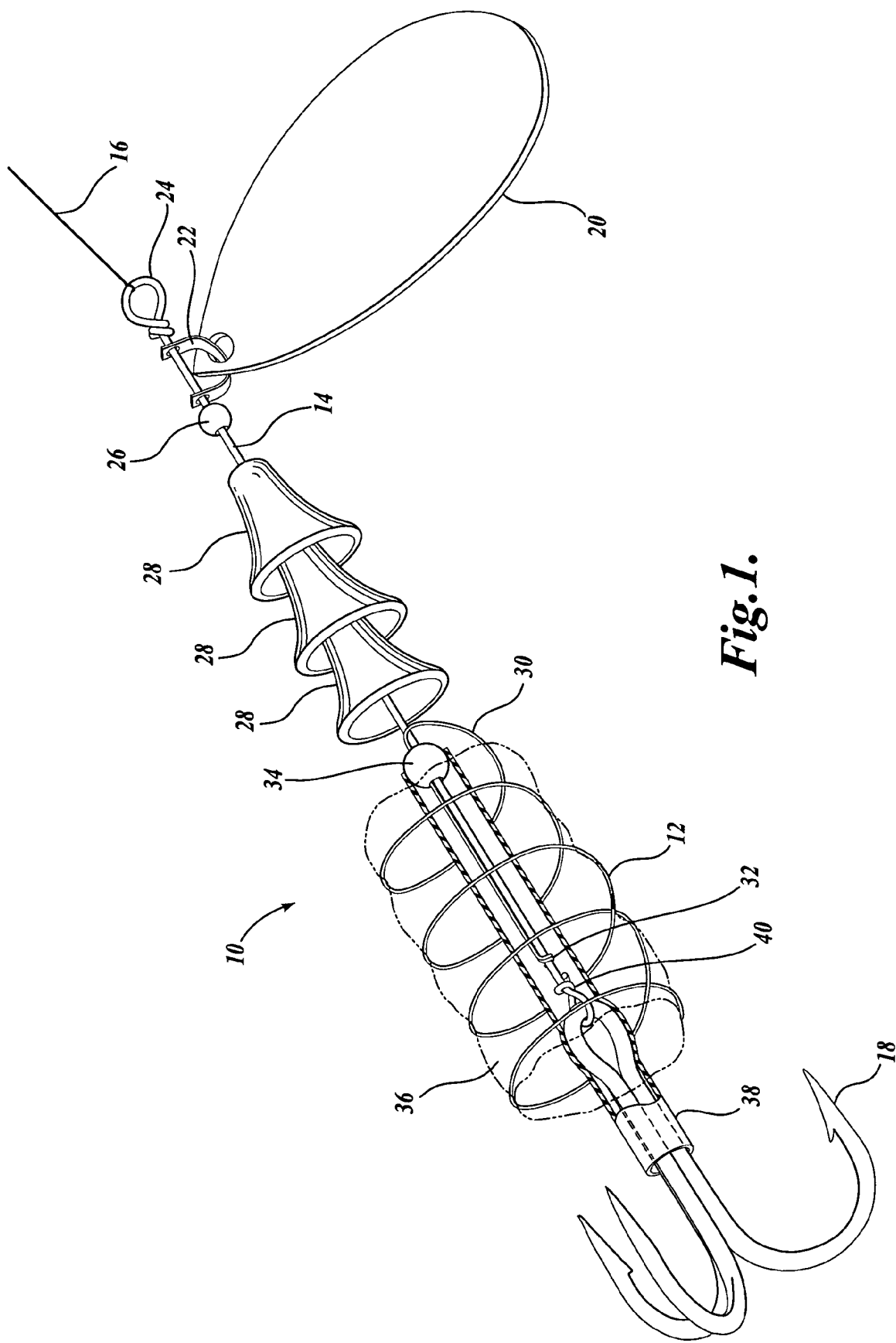
FIG. 1 is a schematic perspective view of a fishing lure made in accordance with the present invention showing a piece of bait in dashed line held in place on a piece of tubing, shown in partial section view, by a wire wrapped therearound.

A fishing lure 10 having an improved bait holder 12 is generally disclosed in FIG. 1. As illustrated, lure 10 includes an elongate shaft 14 which, as shown, is comprised of a piece of wire, preferably stainless steel, having a thickness such that the shaft generally maintains a linear form, during fishing. Wires with a diameter in the range of 0.029 to 0.035 inches have been found to be satisfactory. In general, the shaft acts as a connector between fishing line 16 and a fish hook 18. As illustrated, hook 18 is a treble hook, but it will be understood that single hooks may also be used. In the illustrated embodiment, and beginning at the line end of shaft 14, a metal blade 20 is shown mounted to shaft 14 by means of a clevis 22 such that the blade will spin around shaft 14 as the lure is drawn through the water. Fishing lures typically include spinning components designed to emit flashes of reflective sunlight. Besides blade 20, other items such as multi-winged plugs, spoons and the like may also be used for the same purpose. Blade 20 may be made of stainless steel, silver coated metal or plastic as is commonly known.

As shown, the forward end of shaft 14 is looped and then wrapped around itself to form a closed loop 24 to which fishing line 16 may be tied, either directly, or by means of a conventional snap clip fitting designed to make lure changing quicker and easier. Alternatively, the lure may be formed by connecting the forward end of shaft 14 to a spoon or other conventional fishing lure in place of a trailing hook. In such case, the hook 18 of the disclosed bait holder acts as the lure hook and the spoon is connected to the fishing line 16.

Below clevis 22, a round bead 26 is shown mounted on shaft 14 followed by three bell-shaped beads 28 also mounted on shaft 14. Such beads are typically made of acrylic and may be fluorescent. As will be understood, the number, size, color, and shape of the beads mounted on shaft 14 are a matter of the lure designer's choice. Below these beads, the improved bait holder portion of the lure is shown to comprise a metal wire 30 looped around and secured to shaft 14 at 32. It will be understood that while the end of wire 30 is thus held on the shaft 14, it still has the capability of sliding along the shaft. Wire 30 is shown to extend toward the line end of the lure along shaft 14 and through the center opening of bead 34 which is also mounted on shaft 14. The central opening of bead 34 is sized such that it not only may slide along shaft 14 but also is large enough to accommodate the diameter of wire 30 running there through.

Metal wire 30 is selected such that it is not only easy to bend and unbend repeatedly without kinking or breaking, but also tends to maintain its shape when bent. In one embodiment, 26 gauge floral wire, sometimes known as "paddle" wire, distributed by Panaea Products Corp. of Columbus, Ohio has been successfully used. Wire in smaller or larger gauges ranging from 20 to 30 gauge may alternatively be selected depending on such variables as the size of the lure and the size and type of bait to be held on the lure. Other types of wire, including plastic coated wire may also be used so long as it can withstand repeated immersion in water without rusting, is easily bendable on a repeated basis without breaking and holds its shape after it has been bent around a piece of bait. It is also contemplated that a fisherman having various calibers of wire in his tackle box might choose to change from one gauge of wire to another while fishing, it being a relatively simple task to connect the wire to the shaft such as at point 32, run it along the shaft through bead 34 and then clip it to an appropriate length for wrapping around a piece of bait such as 36 shown in dash line in FIG. 1. Such easy replacement is also a benefit should the wire break after repeated use or because a fish has bitten it.

A piece of vinyl tubing 38 is shown to surround the hook end of shaft 14 and fit snuggly on bead 34. Other materials such as latex, rubber or other types of plastic tubing may also be used. Tubing 38 provides a surface about which bait 36 is wrapped before being spirally encircled and held by wire 30. The diameters of bead 34 and tubing 38 may be selected such that the line end of tubing 38 stretches over bead 34 and is held resiliently in place thereon. It will thus be understood that once so mounted, the bead and tubing may be moved along shaft 14 toward the line end of the lure to allow hook 18 to be attached to shaft 14 by the formation of a second loop 40, similar to loop 24 described heretofore, which interlocks with the cooperating loop of fish hook 18. Thereafter, the vinyl tubing may be moved over the loop portion of the fish hook to the position shown in FIG. 1. It is also contemplated that non-elastic tubing could be used whereby its line end would abut bead 34 rather than being resiliently engaged therewith.

In use, for example, to fish for salmon or steelhead, a piece of herring may be mounted on tubing 38 and then held in place by wrapping wire 30 therearound in a spiral such as shown in FIG. 1. Again, the selection of the thickness and material of the wire causes the wire to hold the herring in place without unwinding. To change baits, wire 30 is simply gripped near its loose end, unwound, a new piece of bait mounted on tubing 38, and wire 30 wrapped therearound.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a fishing lure, the improvement comprising a shaft adapted to maintain a linear form while fishing, said shaft connected at one end to a hook; a bead having an opening sized to receive said shaft and slide freely thereon; a wire connected at a first end to said shaft between said hook and said bead, the second end of said wire extending through the opening of said bead; a tube covering said shaft between said hook and said bead, said tube adapted to hold a bait wrapped therearound; and, the second end of said wire and the wire between the first and seconds ends adapted to be wrapped around said bait positioned around said tube along the longitudinal axis of said lure to hold said bait on said tube while fishing without the need to pierce said bait with said hook.

2. The improvement according to claim 1, wherein said wire is metal and of a material and gauge such that after it is wrapped around said bait it maintains its wrapped shape without said second end being anchored.

3. The improvement of claim 2 wherein said wire is floral wire having a diameter from 18 gauge to 32 gauge.

4. The improvement of claim 2 wherein said wire has a metal core and is coated in plastic.

5. The improvement of claim 1 wherein said shaft is formed of stainless steel wire.

6. The improvement of claim 5 wherein the diameter of said shaft is from to 0.025 inches to 0.04 inches.

7. The improvement of claim 1 wherein said tube is elastic and sized to stretch to receive and hold said bead near the tube end.

8. The improvement of claim 1 wherein said wire is wrapped around said bait in a spiral toward said hook to hold said bait on said tube.

9. The improvement of claim 1 including rotating fish attracting means mounted on said shaft such that said bead is between said fish attracting means and said hook.

10. The improvement of claim 8 wherein said fish attracting means is a blade.

* * * * *

UNITED STATES PATENT AND TRADEMARK OFFICE
CERTIFICATE OF CORRECTION

PATENT NO.       : 7,024,813 B2                                          Page 1 of 1
APPLICATION NO.  : 10/828943
DATED            : April 11, 2006
INVENTOR(S)      : F.R. Griss It is certified that error appears in the above-identified patent and that said Letters Patent is hereby corrected as shown below:

Title page, item

| COLUMN | LINE | ERROR |
|---|---|---|
| (57) Pg. 1, col. 2 | Abstract 1-20 of text | delete the Abstract in its entirety and insert --In a fishing lure an improved system for holding a bait comprising a wire connected to a central shaft and extending through the central opening of a bead also mounted on the shaft. A piece of elastic tubing extends over the central shaft to form a surface on which a bait is held. The wire is wrapped around the bait to hold it in place. The wire is selected to be of a material and thickness such that it may be easily bent and unbent without kinking or breaking and once wrapped around a bait maintains its shape to hold the bait in place on a lure during fishing.-- |
| 4 (Claim 1, | 8 line 10) | "seconds" should read --second-- |

Signed and Sealed this

Eighth Day of August, 2006

JON W. DUDAS
*Director of the United States Patent and Trademark Office*